T. L. CARBONE.
PROCESS FOR MANUFACTURING ELASTIC TIRES FOR WHEELS.
APPLICATION FILED JULY 22, 1908.
931,563. Patented Aug. 17, 1909.
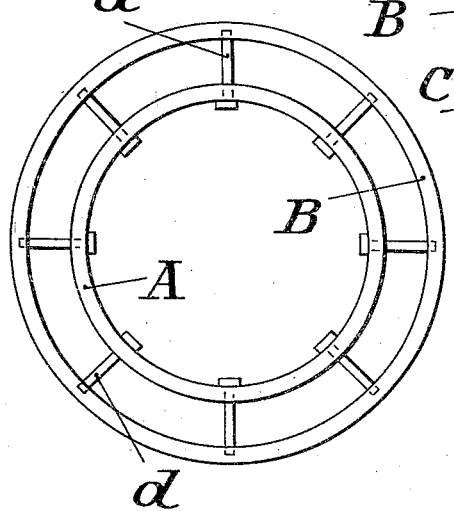
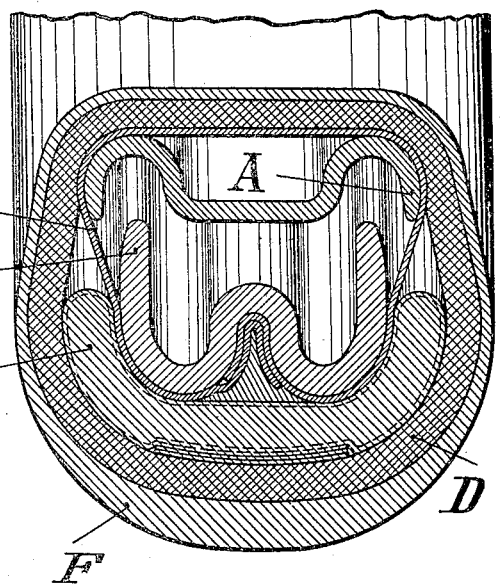
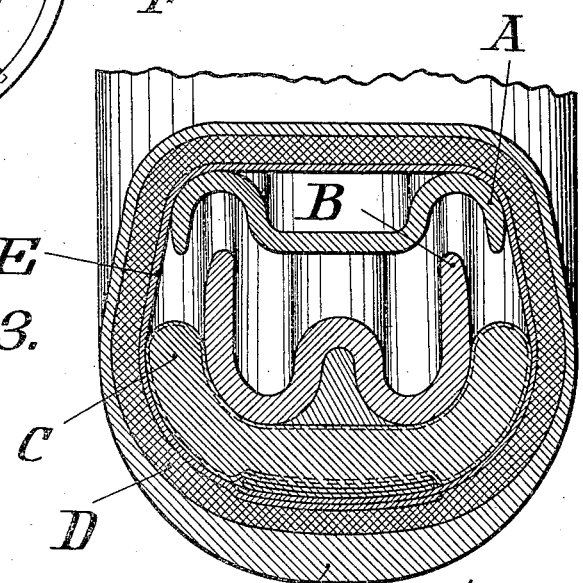

UNITED STATES PATENT OFFICE.

TITO LIVIO CARBONE, OF CHARLOTTENBURG, GERMANY.

PROCESS FOR MANUFACTURING ELASTIC TIRES FOR WHEELS.

No. 931,563.      Specification of Letters Patent.      Patented Aug. 17, 1909.

Application filed July 22, 1908. Serial No. 444,754.

*To all whom it may concern:*

Be it known that I, TITO LIVIO CARBONE, engineer, a citizen of the Swiss Republic, residing at 69 Fasanenstrasse, Charlottenburg, near Berlin, Germany, have invented certain new and useful Improvements in or Relating to Processes for Manufacturing Elastic Tires for Wheels; and I do hereby declare the following to be a full, clear, and exact description of the invention, such as will enable others skilled in the art to which it appertains to make and use the same.

The present invention relates to a process for manufacturing elastic tires of the type that contains two or more concentric spreading rings of steel or any other suitable material inclosed in a casing.

The object of the present process is to enable the tire to be vulcanized in the usual manner as a whole. This is a matter of some difficulty as on the one hand the rings must be securely fixed in their relative positions in the cover during vulcanization, the cover or casing being hermetically closed during the operation, whereas on the other hand the rings must be freely movable inside the finished tire. According to the present invention this is accomplished by fixing the two spreading rings to each other in an exactly concentric position by means of some removable holding device, inclosing the rings in the casing and then vulcanizing in the usual manner. After vulcanization the holding device is removed.

The casing is vulcanized in a known manner by introducing chemical substances into the closed cover which are evaporated by the heat employed in the process of vulcanization. The gases produced in this manner inflate the tire and press the layers of the fabric of which the casing is composed together, so that they remain closely united after vulcanization. It has however been found that the gases often penetrate into the tissue of the casing and between the layers, thereby preventing the layers from becoming closely united. The consequence of this is that the parts of the casing do not form a uniform mass after vulcanization and have little resistance and also that the tire often does not take the desired form.

In carrying out my invention I obviate these inconveniences by placing a covering of rubber over the spreading ring or rings into which the substances to be evaporated are introduced before closing it definitely. Over this cover the layers of fabric forming the casing of the tire are placed and vulcanized as usual. The expanding gases inflate the covering of rubber and press it against the fabric of the casing which are thus pressed against each other without the gases being able to penetrate them.

The process to which the present invention relates is illustrated by the drawing annexed:

Figure 1 is a diagram of the two spreading rings in position for carrying out the present invention. Figs. 2 and 3 are cross sections of different forms of execution of the tire manufactured according to the present process.

In the drawing A and B are the two spreading rings surrounded in the finished tire by the casing D, a cushion C being inserted between the outer ring B and the casing.

In carrying out the process according to my invention I proceed as follows:

The two spreading rings A and B are connected by a suitable device by which both rings are fixed in an exactly concentric position. For instance a number of screw bolts *d* may be placed through both the rings by adjusting the screws of which the rings can be fixed in their position and at the same time centered. It is however necessary that the fixing device can be removed out of the finished tire or at least that its strength will not stand a higher strain than is put upon it in the course of manufacture, so that it will break as soon as the wheel comes into use and is exposed to higher strains. I may also employ for this purpose flexible spokes of rope or any other suitable material instead of rigid bolts to connect the two spreading rings provided these spokes are exactly strong enough to withstand the strains occurring in the process of manufacture and break as soon as the wheel is used for actual work, so that they do not impede the free movement of the spreading rings inside the casing.

To give the tire the form illustrated in Fig. 2 the two spreading rings A and B are inclosed in the rubber covering E into which the substances to be evaporated are introduced. Then the cushion C of rubber or another suitable material is put in its place. This cushion is subjected to a preliminary vulcanization which is carried to such an extent that the cushion preserves its form during manufacture and is brought to the requisite degree of softness and elasticity in the subsequent final vulcanization of the whole tire. The cushion is given the composition necessary for this purpose. After putting the cushion C into its place the casing D of the tire is formed over it by winding successive layers of fabric impregnated with rubber around the spreading rings and cushion. The whole is then inclosed in a second layer of rubber F. Preferably the casing D as well as the outer layer of rubber F are made of increased thickness on the outer or tread part of the tire. At this stage of manufacture the tire is placed in a vulcanizer and vulcanized in the usual way.

In the tire shown in Fig. 3 the inner covering of rubber E surrounds also the cushion C. The action of the covering during vulcanization is however the same as in the arrangement shown in Fig. 2. The gases produced by the heat in vulcanization inflate the covering E and press it against the layers of tissue forming the casing of the tire, thereby forcing them outward and pressing them against each other. The tire may be for this purpose inclosed in a metal mold or a casing of fabric not impregnated with rubber. The mold or fabric in this case prevents the rubber fabrics from expanding and these are in consequence pressed tightly together by the pressure of the gases from within, these being at the same time prevented from penetrating into the fabrics. By this means the different layers are united intimately during the process of vulcanization.

The rubber cushion C shown in Fig. 2 may be also made of porous rubber of the sort employed for the manufacture of rubber sponges but with smaller pores. For this purpose long strips of rubber of the section of the desired cushion are prepared, made porous and subjected to a preliminary curing. These strips are then placed on the rubber covering surrounding the two stretching rings to form the cushion before described and the tire is then vulcanized as described. The gases formed in the inside of the covering E can not in this case penetrate either into the fabric of the casing nor into the pores of the cushion, as they are inclosed in the rubber covering E. When the tire thus prepared is taken out of the vulcanizer, openings are made in the casing D on the inside of the tire over the bolts d and the bolts are removed. The tire is then ready for use. The heads of the bolts d project sufficiently over the surface of the inner spreading ring that they can be easily found by feeling along the inner surface of the tire.

Having now particularly described and ascertained the nature of my said invention, and in what manner the same is to be performed, I declare that what I claim is:

1. A process for vulcanizing elastic tires containing two or more concentric spreading rings in a closed casing, as a whole, consisting in first securing the spreading rings in their concentric position by a removable fixing device, then placing the casing over the rings, and vulcanizing the whole in this position, the fixing device being afterward removed.

2. A process for vulcanizing elastic tires containing two or more concentric spreading rings in a casing, consisting in placing an elastic cushion on the outer spreading ring, this cushion being subjected to a preliminary vulcanization so that it may retain its form during final vulcanization, putting on the casing, and finally vulcanizing the whole, by which the cushion is given the requisite degree of softness and elasticity.

3. A process for vulcanizing elastic tires containing two or more concentric spreading rings in a closed casing, as a whole, consisting in securing the spreading rings in their relative position in the casing during vulcanization by removable bolts, the heads of which project over the inner surface of the spreading ring so that the bolts can be easily found and removed after an opening has been made in the casing.

In testimony, that I claim the foregoing as my invention, I have signed my name in presence of two subscribing witnesses.

TITO LIVIO CARBONE.

Witnesses:
   WOLDEMAR HAUPT,
   HENRY HASPER.